Figure 1:
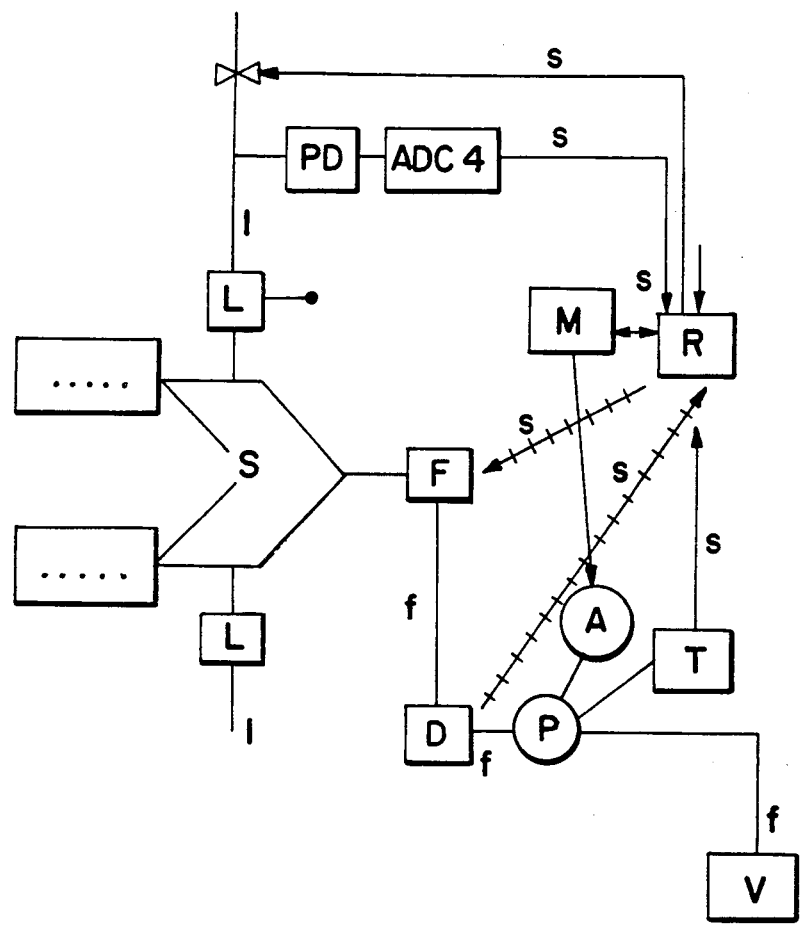

United States Patent [19]

Glasel et al.

[11] Patent Number: 5,056,623
[45] Date of Patent: Oct. 15, 1991

[54] PROCESS FOR THE CONTROLLED RELEASE OF METERED QUANTITIES OF LUBRICANT WHEN COATING PRESSING TOOLS WITH LUBRICATING LIQUIDS AND SUSPENSIONS AND APPARATUS FOR CARRYING OUT THE PROCESS

[75] Inventors: Volker I. Glasel, Hegauweg; Gunther M. Voss, Ziegelstadel, both of Fed. Rep. of Germany

[73] Assignee: Dr. Karl Thomae GmbH, Biberach an der Riss, Fed. Rep. of Germany

[21] Appl. No.: 501,452

[22] Filed: Mar. 29, 1990

Related U.S. Application Data

[63] Continuation of Ser. No. 284,287, Dec. 14, 1988, abandoned, which is a continuation-in-part of Ser. No. 101,882, Sep. 28, 1987, abandoned.

[51] Int. Cl.$^5$ .............................................. F16N 27/00
[52] U.S. Cl. ..................................... 184/7.4; 184/6.4; 184/6.26; 184/6.1
[58] Field of Search ................. 184/7.4, 6.1, 6.4, 6.14, 184/6.26, 54, 55.1; 425/107, DIG. 15, 96, 102; 118/692, 697, 694, 663, 708

[56] References Cited

U.S. PATENT DOCUMENTS

| | | | |
|---|---|---|---|
| 4,205,708 | 6/1980 | Burgbacher | 184/6.26 |
| 4,554,887 | 11/1985 | Yoakam et al. | 118/692 |
| 4,707,309 | 11/1987 | Voss et al. | 425/DIG. 115 |
| 4,822,647 | 4/1989 | Nozaki et al. | 118/692 |

Primary Examiner—Ira S. Lazarus
Assistant Examiner—Alan B. Cariaso
Attorney, Agent, or Firm—David E. Frankhouser; Alan R. Stempel; Mary-Ellen M. Timbers

[57] ABSTRACT

The specification describes a new process and apparatus for the controlled release of metered quantities of lubricating liquids or suspensions for applying a coating of lubricant to mechanically stressed zones of pressing tools in tablet-making machines, wherein the lubricating solution or suspension is fed into one or more liquid valves synchronously with the cadence of the tablet-making machine from a pressureless storage container by means of a pulsation-free pump, and any pressure variations occuring in the liquid supply line to the valves are compensated by changes in the times of opening of the valves.

5 Claims, 3 Drawing Sheets

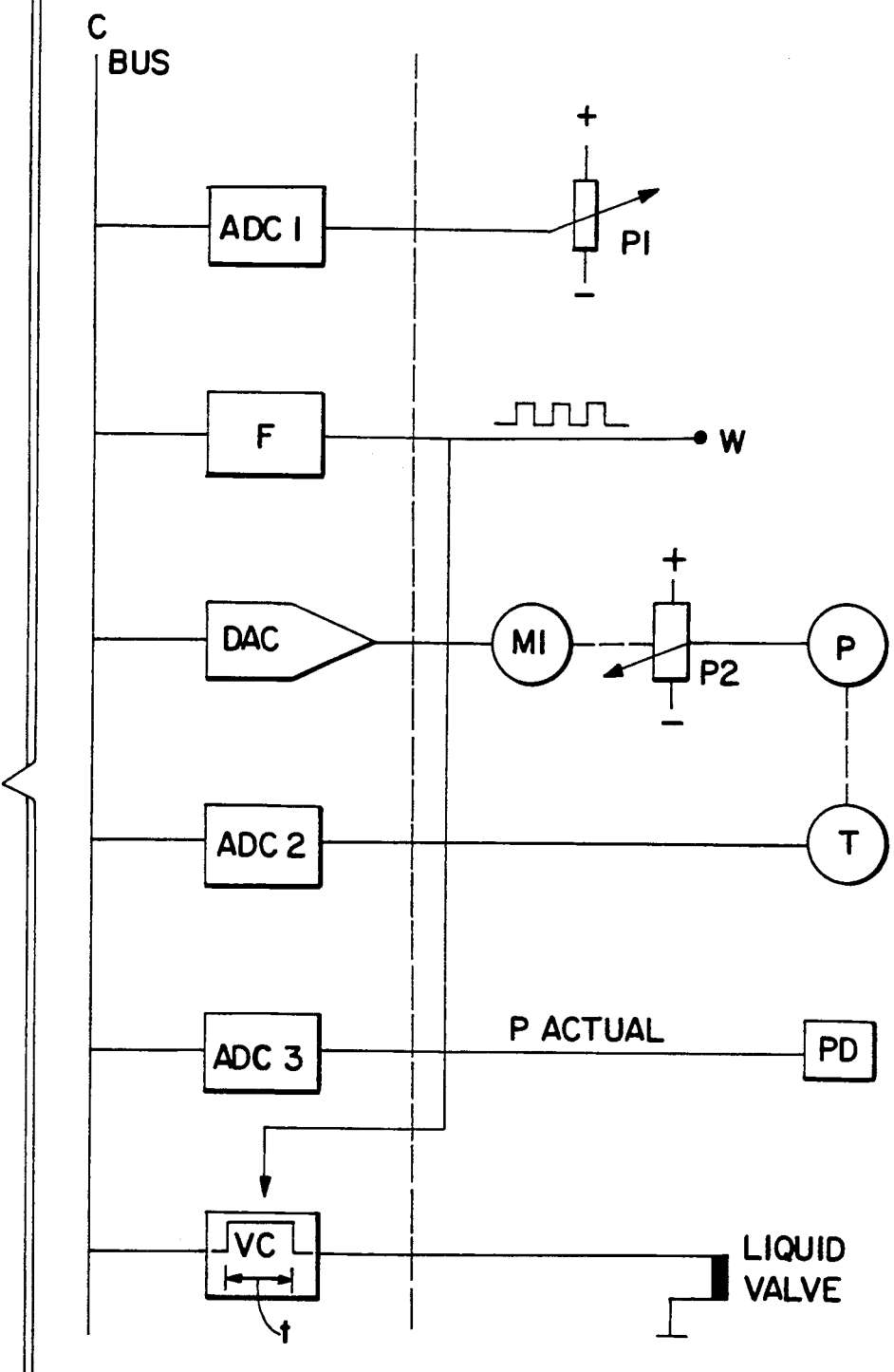

PROCESS FOR THE CONTROLLED RELEASE OF METERED QUANTITIES OF LUBRICANT WHEN COATING PRESSING TOOLS WITH LUBRICATING LIQUIDS AND SUSPENSIONS AND APPARATUS FOR CARRYING OUT THE PROCESS

This is a continuation of application Ser. No. 284,287, filed Dec. 14, 1988, which in turn is a continuation in part of application Ser. No. 101,882 filed Sept. 28, 1987, both now abandoned.

The invention relates to a new process for controlled release of metered quantities of lubricant for coating the mechanically stressed zones of pressing tools with lubricating liquids and suspensions and apparatus for carrying out the process.

DE-Al-33 12 634 describes a process and apparatus for dotting moulding tools with droplets of liquid or suspended lubricants in the manufacture of blanks in the pharmaceutical, food or catalyst fields. Pressurised lubricant solutions or suspensions and pressurised gases are fed alternately through capillaries connected to alternating single-substance nozzles so that drops are formed under a gas jet at the surface of the nozzle and these drops are removed therefrom and applied to specific zones of pressing tools. The apparatus comprises fast-acting valves for the brief release of pressurised gases and lubricating liquids or suspensions, the lines leading away from a gas valve and a liquid valve joining up in front of a capillary, and single-substance nozzles being provided at the ends of the capillaries. The capillaries together with the single substance nozzles are housed in specific arrangements in so-called dotting shoes. In this process, the quantity of lubricant required is taken from a pressurised container and fed or metered into the capillaries in question by means of liquid valves.

It has been found that the liquid valves vary their throughflow rate in the long term, e.g. by a change in the valve seat, starting from the throughflow rate originally determined and adjusted, for a given specific time of opening. This deviation has hitherto been corrected by determining the quantity of liquid delivered per unit of time by monitoring the quantity in the storage container by means of a balance and correcting the valve opening times accordingly if there are any deviations. The weighing process required for this, which was affected by the strong vibrations of the press, was a drawback. The speed of rotation of the tablet press also had to be taken into consideration during the monitoring since any change in the number of pressing cycles would also change the quantities delivered per unit of time through the liquid valves.

In the process according to the above application it is essential for the liquid container to be under elevated pressure. If the solvent or suspension agent is a low alcohol, the pressurised container constitutes a safety hazard. In addition, each time the system has to be topped up, the entire system has to be evacuated and re-set before it is started up again. It should also be mentioned that hitherto it has not been possible to shorten this process since there is no throughflow measuring system for measuring the tiny quantities required (the smallest throughflow quantity which can be monitored is about 3 liters per hour).

It has now been found that these disadvantages can be eliminated if the lubricant solution or suspension is fed into one or more liquid valves from a non-pressurised storage container by means of a pump which operates without any pulsations, e.g. a gear pump, the delivery of the pump and the actuation of the liquid valves being matched to the cadence of the tablet-making machine in order to obtain the quantity of lubricant required for proper coating of the pressing tools. This procedure ensures that once a particular throughput of lubricating fluid has been selected it is maintained.

The delivery of the pump is checked by means of a tachogenerator running concurrently with the pump in order to obtain a permanent equalising process, the findings are fed into a computer which compares the findings with the ratio of cadence to delivery already established, fed in through a potentiometer, and if there are any deviations caused by changes to the machine performance (cadence), the computer causes a suitable correction to be made in order to restore the ratio originally set up via a further potentiometer which is, f.i., actuated by a motor operator governed by the computer and which controls the drive of the pump. The necessary quantity of lubricant at a determined cadence is adjusted by the first mentioned potentiometer.

The drive is linked to the above mentioned computer, which also operates the actuation system for the valves, resp. the time of actuation of the valves, in such a way that the pump performance and the actuation time of the valves are always adapted to each other, i.e. if the timely length of the actuation itself gets longer, the pump performance is diminished, and vice versa. This adjustment process is important considering possible changes in viscosity, temperature, electric supply fluctuations, obstructions in the pipe-lines etc., especially, however, when alternations in the size and shape of the forms to be pressed are to be made.

If there is any change to the liquid valves (e.g. the valve seats) and as a consequence the throughflow rates alter, this pump control is also used to correct the resulting deviations, specifically by measuring the pressure difference in the conveying system between the pump outlet and the entry to the liquid valve, by comparison with an adjusted pressure set up at the start. If the valve seating of the liquid valve has changed so that, for the same given time of opening, it now meters less than the required quantity of liquid, the pressure between the valve and the pump will automatically increase or, if the valve seat has worn so much that the throughflow rate has increased, the pressure will drop. This differential pressure can easily be determined, e.g. by means of hydraulic manometers, differential pressure gauges, and is then digitally displayed by a computer and processed so that it shortens or lengthens the valve opening times accordingly. The quantity of lubricant required is guaranteed by the lubricant pump operating synchronously with the machine cadence and not as before by the valves which are only coded at the beginning and whose throughflow rates can change, as already explained.

To sum up, the process according to the invention has following advantages:

(a) there is no need for a pressurised container holding the lubricating liquid or suspension, (b) metering is carried out automatically in synchronism with the cadence of the tablet-making machine, (c) the excess pressure prevailing at the pump outlet is used for measurement of a differential pressure, relative to a given pressure, and if any deviations are found the program-dependent opening times of the liquid valves are corrected. This ensures that the tool surfaces are guaranteed to receive the quantities of lubricant required, (d) the liquid valves no longer meter but merely "divide up" a quantity of liquid or suspension which has previously been metered by the pump.

The invention further relates to an apparatus for carrying out the process. This apparatus consists of a pressure-free storage container which can be topped up continuously and which is connected via a line to the input of a pump which operates without pulsations. The pulsation-free pump is preferably a gear pump, e.g. having gear wheels with inclined teeth consisting of self-lubricating plastics material such as Teflon. The outlet from the pump leads as a pressure line to one or more liquid valves; the pressure line contains a differential pressure measuring system known per se which operates, for example, hydraulically and directly or pneumatically and indirectly; any differences in pressure measured relative to a preset or given pressure (rated pressure) are converted into electrical values and these are fed into a computer or comparator. The computer monitors and compares the incoming values with the rated values already fed in. If pressure variations exceed a certain amount, the control times of the liquid valves are varied accordingly so as to shorten or lengthen the valve opening times. The differential pressure may be measured, for example, by so-called differential pressure sensors which can measure to a precision of up to plus or minus 0.5%. Piezo-resistant sensor system of this kind convert the mechanical pressure magnitude proportionally into an amplified output signal from 4 to 20 mA, for example, and the measuring range covers, at most, 0 to 1000 bars.

The pulsation-free pump is equipped with a drive component, e.g. a low voltage DC motor, whilst a contact-free electronic regulating device which acts on the speed of the pump motor continuously compares the rated voltage, which is set up by means of a potentiometer, with the voltage of a tachogenerator coupled to the drive shaft and regulates the speed of the pump motor accordingly. For example the speed of the pump, which is independent of load and mains fluctuations, for example, independent of changes in viscosity, temperature, obstructions in the filter or voltage fluctuations, is compared with the cadence of the tablet-making press by means of a tacho generator coupled to the pump, analog-to-digital converter, computer, digital-to-analog converter and motor operator actuating the potentiometer of the pump and if necessary adapted thereto. The first adjustment of the pump delivery, carried out by measuring in liters, is fed into the same computer for the valve control, coupled to a given cadence of the tablet making machine. This adjustment operates as a closed regulating circuit and by means of its feedback system compensates for any voltage fluctuations in the mains supply and also any fluctuations due to the above mentioned possible changes in viscosity, temperature obstructions in the pipe-lines etc.

The output lines from the liquid valves lead into a mixing chamber or into a fork into which the gas inlet line controlled by a gas valve also leads; connected to the end of this mixing chamber, which may also be in the form of a mixing channel or fork with an adjacent mixing channel, is a so-called nozzle connection which consists of a cavity of a specific volume and has nozzles for delivering the droplets. The air valves are controlled by the computer so that they, synchronously, however, at staggered times, deliver a defined gas jet which serves to produce a bulge in the meniscus at the ends of the nozzles, to release the droplets and accelerate them.

In order to obtain a signal for actuating the air valves at the staggered time t1, the cadence of the pressing tools taken up by a sensor is fed to the computer, forming a delayline, which itself is, if desired, readjustable. The signals given by the computer control the actuation resp. opening of the air valves, whereby the timely length t2 of the opening can preferably also be controlled by the computer. For actuating the air valves at a staggered time t1 see FIG. 4, for changing the length of the opening time t2 see also FIGS. 2 and 3.

In order to compensate for any changes in the valve seats of the pressurised gas valves a differential pressure measurement is used again, by means of suitable components, the data from which are compared by the computer, whilst the length of the program-dependent periods of opening of the pressurised gas valves are varied so that the gas jets produced are always constant (the same volume of gas for the same length of time). The computer which automatically adapts the length of the opening time t2 of the air valves to the actual air pressure before the air valves, compares the actual pressure with the set nominal pressure and whenever differences occur, gives error signals causing via the hardware a change of the opening time t2 in a way as already described for the regulation of pressure in the fluid lines. Whenever the delay of the opening of the air valves simultaneously is to be corrected, a programmed delayline in the computer controls the delay t1 of the opening of the valves with regard to the cadence of the pressing tools; as is seen the opening time t2 is independent of the delay time t1.

The apparatus according to the invention has the advantage that as individual nozzles begin to be blocked up the pressure in the line between the pump and the liquid valves increases and, after the pressure difference has been detected by the computer, the opening times of the valves are extended as necessary; this ensures that the same quantity of lubricant continues to be released to the relevant zones of the pressing tools. However, if the differential pressure increases beyond a certain threshold, a fault signal will be produced. The same applies to the reverse procedure, when the times of opening of the valves are shortened if the differential pressure falls; if the differential pressure drops by more than a certain amount below the rated pressure, again a fault signal is produced.

FIG. 1 shows an embodiment by way of example of the object of the invention:

FIG. 1 is a plan of the entire apparatus in which the control elements are also included. In the drawings:

P is a pulsation-free pump,

V is a pressureless storage container for holding the lubricant liquid or suspension, D is a differential pressure measuring system adjusted to a rated value, A is a drive motor for the pump, F is a liquid valve, L are gas valves, S are nozzle connections containing nozzles for releasing the droplets of lubricant, T is a tachogenerator, R is an electronic computer with memory and electronic circuitry, M is a potentiometer adjusted to rated values simultaneously acting as an automatic control member in conjunction with the comparator, "f" indicates the liquid lines and "l" indicates the gas or air lines and "s" indicates the electronic connections.

The symbol "———→" represents the connection or electronic control as the feedback system between the tachogenerator, computer, potentiometer, drive motor or potentiometer-computer/ comparator, The symbol "⊢⊢⊢⊢→" represents the connection or electronic control between the differential pressure gauge, computer and liquid valve.

Pump P produces a flow of a defined volume per time unit in the liquid lines (f); depending on the opening times of the liquid valves (F) a pressure within the liquid line (f) is established, which pressure acts on the pressure sensor (D), giving signals to the computer (R). Computer (R) regulates the liquid valve (F), thus establishing a connection between the computer and the valve (F) (see FIG. 1).

Whenever the opening times of the valves get longer (f.i. in the case that the mean pressure in the fluid is too high), a greater volume of the fluid is allowed to pass the valve (F), thus diminishing the pressure in the liquid line.

A predetermined or pre-chosen value of nominal pressure is given to the computer, which operates in the sense that the actual pressure is adjusted to the nominal pressure by actuating the valves resp. the opening times of the valves.

M comprises a potentiometer P1 (see also FIG. 2) adjusted to the nominal value of pressure and potentiometer regulating the pump, for example with the help of a motor operator (M1) as shown in FIG. 2. The cadence, indicated by an arrow, is directly given to the computer R.

FIG. 2 shows a basic circuit diagram according to the invention for the control of the delivery of lubricants.

In FIG. 2 (P1) is a potentiometer connected via an analog-to-digital converter with a computer (C) (BUS) being the plug for this connection. (P1) allows the adjustment of the ratio of cadence of the pressing tools to the delivery of the pump (P). (W) designates the input of the cadence, being connected to the computer via a frequency counter (F) and to the valve opening regulation center as part of the computer. The motor operator (M1) is in line with a digital-to-analog converter (DAC) and the computer; the motor operator regulates the potentiometer (P2), which governs the pump (P). A tachogenerator (T) is on its one side connected with the pump (P) for checking services and, on the other side, via an analog-to-digital converter (ADC2), with the computer. A liquid pressure sensor (PD) is connected to the computer by an analog-to-digital converter (ADC3), whereby the computer, which compares the actual with the set nominal pressure, regulates and controls the opening times of the liquid valves by a control mechanism (VC), which is electrically connected to the valves.

Figure 3:
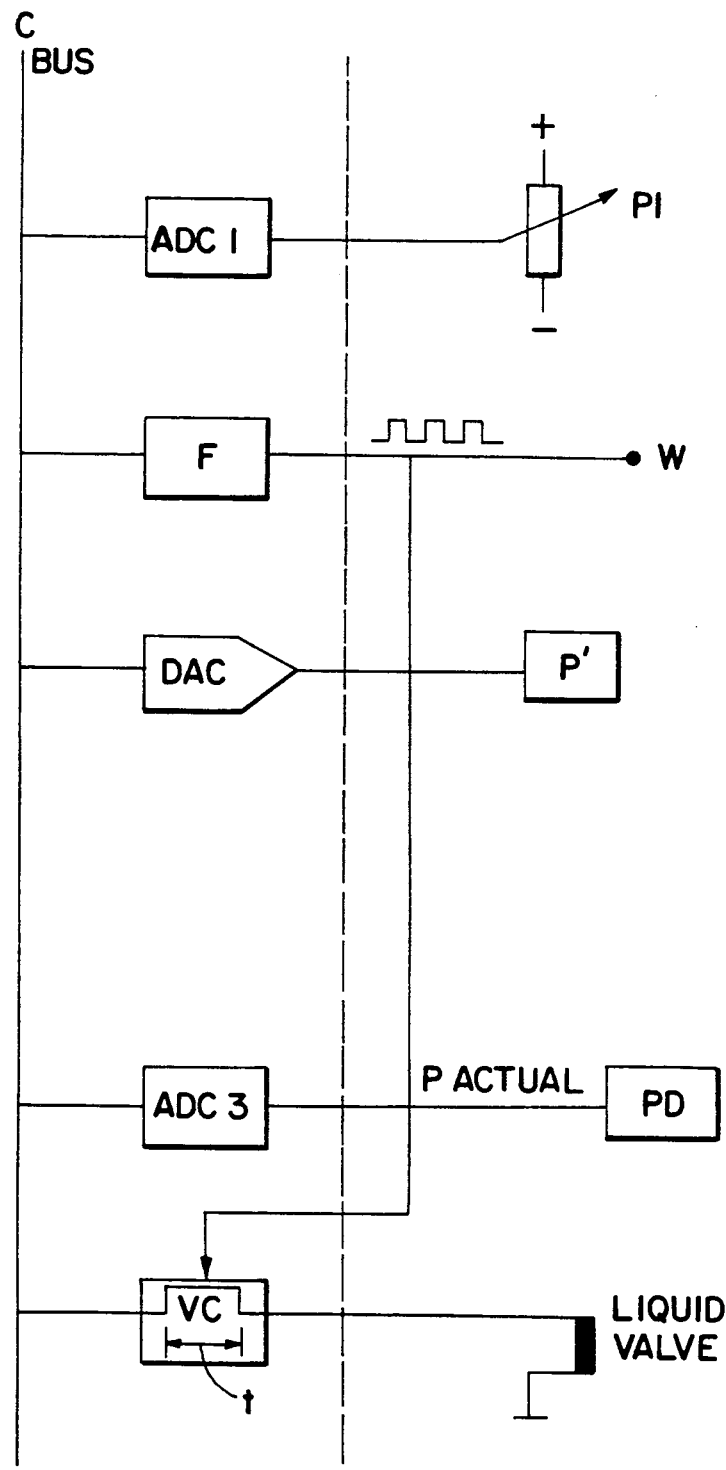

FIG. 3 shows a similar basic circuit diagram, wherein the circuit computer-(DAC)-(M1)-(P2)-(P)-(T)-(ADC2)-computer is substituted by a pump P' having an autonomous feed back system, for example by an "Ismatec MC/MS"-pump.

Figure 4:
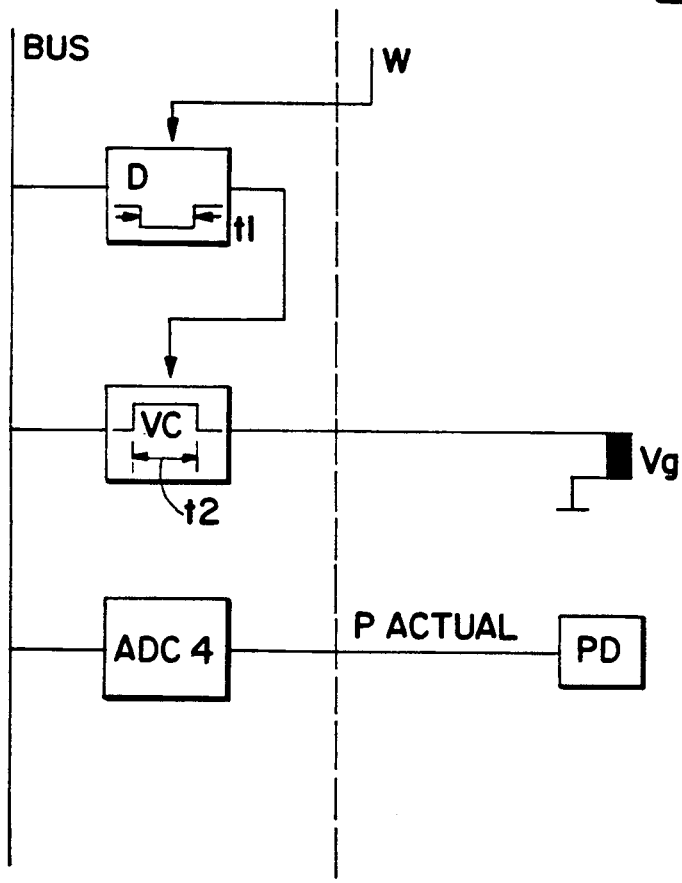

FIG. 4 shows a continuation of FIGS. 2 or 3, which governs the actuation of the air valves (Vg) the time of actuation being delayed for the time (t1) with regard to the time of actuation of the liquid valves and, whenever a change of the opening time (t2) of the air valves is needed this change is effected in order to restore the set ratio of actual to nominal pressure of the gas. A delay-line programmed in the computer causes a delay of the opening of the valves with regard to the cadence resp. the opening of the fluid valves. This part of the computer hardware, designated by (D), is connected with the cadence input (W) on the one side, on the other side with the computer and directly with the part of the hardware, which is also responsible for the length (t2) of the opening time of the air valves. A pressure sensor (PD) which measures the actual pressure is connected over an analog-to-digital converter with the computer. The computer compares the actual gas pressure measured by the pressure sensor (PD) with a set nominal pressure and produces error signals whenever a difference exists. The error signals cause s change of the opening time (t2) of the air valve (Vg).

EXAMPLE 1

Preparation of Pressed Pieces

Using a tabletting machine (model 3000 from Messrs. Wilhelm Fette GmbH, D-2053 Schwarzenbek) fitted with 2 lubricant stations each having 2 nozzle sets of 5 nozzles each, and the remainder of the arrangement according to the invention, compressed tablets of acetylsalicyclic acid and lactose/starch (diameter 19 mm) were prepared by the process according to the invention. The metering pump ran synchronously to the speed of revolution of the tabletting press under a maximum liquid pressure of 6 bar.

A sensor tapped the starting time on a top ram. A liquid valve opened for a time of 2.6 ms, and at the same time a delay for the gas valve started (about 2.4 ms delay time). After the liquid valve had closed, a pressure sensor fitted between the pump and the valve sensed any pressure differentials, which may have arisen, within a range of ±10% and, if there were deviations, microprocessor balanced the opening time of the liquid valve. With the closing of the liquid valve, the air valve started the opening process, after expiry of the delay, the opening time being 2.4 ms. Here again, a fitted sensor automatically regulated any valve seat wear which might have occurred. The metering step thus induced lubricated the die edge. After the coded and, if necessary, readjusted air valve time had expired, the air valve closed. A coded pause time caused the above steps to be repeated. At a speed of revolution of 1 m/s of the tabletting disc, the second shot of lubricant hit the center of the die, and the third shot hit the opposite die edge. A coding switch determined the number of required repeats of the cycles before a new tap at the ram shaft. The lubricant fluid was under a pressure of 2.8 bar, and the air was 3.3 bar.

At 180,000 cycles/hour and with 2 lubricant stations each having 2 nozzle sets with 5 nozzles each, the pump throughput was 320 ml/hour in total or 80 ml per hour per nozzle set. The lubricant consisted of 4% by weight of stearic acid and 6% by weight of polyoxyethylene sorbitan monooleate in ethanol.

Under the same compression force as in a tablet compressed by conventional methods, the breaking strength of the tablet was 40% higher. Since the granules were not mixed with a hydrophobic lubricant the disintegrating agent was able to deploy its full activity. The disintegration time of the tablet was thus reduced from 65 to 9 seconds.

EXAMPLE 2

Realization of the Delivery of Lubricants

The desired volume of delivery of pump (P) for each pressing operation is adjusted by a potentiometer (P1). The resulting voltage therefrom is fed via the analog-to-digital converter (ADC1) into a computer. The pressing operations are recorded by a sensor (W) counting the frequency of the pressing tools, the resulting signals are also fed via a frequency counter (F) into the computer. Both values are multiplicatively connected yielding the nominal number of revolutions of the pump.

Via a digital-to-analog converter (DAC) the voltage corresponding to this value is fed to a motor operator (M1) regulating the potentiometer (P2) which adjusts the speed of the pump (P). The number of revolutions or the speed of the pump is checked by means of a tachogenerator (T), the values are fed by an analog-to-digital converter (ADC2) into the computer.

By subtracting the nominal from the actual number of revolutions of the pump the computer calculates an error signal. This error signal serves to correct the drive signals of the motor operation (M1) via the digital-to-analog converter DAC.

The number of revolutions of the pump is the product of the pressing operations of the pressing tools and the ratio-value (P1).

The pressure sensor (PD) (e.g. a piezoresistive sensor) senses the pressure before the valves (P act.) and feeds the values via the analog-to-digital converter (ADC3) into the computer.

The computer compares the actual pressure with the nominal pressure being fed into the computer either as a fixed value or by way of a keyboard and calculates from the difference a corresponding error signal.

The signal is used by the computer to change the valve opening time (t) in such a way that the measured actual pressure is equalised to the preset nominal pressure, which means: if the actual pressure is too high, the valve opening time is lengthened accordingly enabling a greater volume of fluid per time unit to flow through and causing a corresponding decrease of pressure, and vice versa. In this way the actual pressure is continuously adapted to the preset nominal pressure.

The connections demonstrated by this Example are graphically shown by FIG. 2.

EXAMPLE 3

This Example is in its functioning aspects equal to Example 2.

Only the feed-back circuit of the pump (P) does not include a computer control. In this Example a pulsation-free (P') pump is used having an autonomous feed-back system, for example a geared pump (Ismatec MC/MS). The computer only provides the signal for the nominal number of revolutions of the pump via a digital-to-analog converter (DAC). Deviations expressed by error signals are compensated by an autonomous control loop within the control drive electronics of the pump.

The connections demonstrated by this Example are graphically shown by FIG. 3.

We claim:

1. A process for a controlled release of metered lubricating liquid or suspension in applying a coating of lubricant to mechanically stressed zones of pressing tools in tablet-making machines, comprising the use of a pump operating without pulsations for metering said lubricating liquid or suspension from a pressureless storage container to one or more liquid valves, whereby the delivery of the pump and the actuation of the liquid valves is matched to the cadence of the tablet-making machine, the delivery of said pump being checked by means of a tachogenerator running concurrently with the pump, the findings of the tachogenerator being compared by a computer with an established ratio of cadence of the machine to delivery of the lubricating solution or suspension fed in through a potentiometer, found deviations in the actual ratio of cadence to delivery from the pre-set ratio of cadence to delivery being corrected by a computer via a further potentiometer until said originally set-up ratio is restored, and, to compensate for an underpressure or overpressure of said lubricating liquid or suspension prevailing at the pump outlet, measuring the actual pressure at said pump outlet, comparing it to a pre-set pressure to obtain an error signal, changing the time of opening of the liquid valve in response to this error signal, whereby the pump performance and the actuation time of the valve remain always adapted to each other and to the cadence of the pressing tools, and measuring the actual pressure of gas before a gas valve upstream in a gas pipeline ending in the lubricant pipeline before the nozzle or nozzles, comparing the actual gas pressure to a preset gas pressure to obtain error signals, changing the time of opening of the gas valve or gas valves in response to said error signals, the actuation of the gas valve or gas valves being timely adapted to the cadence of the pressing tools in a way that a defined gas jet at a staggered time with regard to the actuation of the liquid valve is delivered.

2. A process as claimed in claim 1 comprising
    a sensor counting and recording the frequency of the pressure tools to be lubricated to a computer,
    a signal generator, which produces signals corresponding to a desired volume of delivery of the pump(P) for each pressing operation and feeding these signals into the computer, which combines the recorded frequency and the desired volume of delivery to establish the theoretically necessary number of revolutions of the pump,
    the computer controlling the speed of the pump by a tachogenerator (T) running concurrently with the pump and checking the speed of the pump, feeding the found signals into the computer which compares said signals with preset signals and in the case that there are any deviations between said signals producing an error signal, which changes the drive of the pump as long as said deviation exits,
    the computer giving signals according to the frequency of the pressure tools to actuate the liquid valves,
    a pressure sensor (PD) measuring the pressure of the pump outlet before the liquid valve, feeding these values into a computer, which is fed by a pre-set nominal value and which compares the values for the nominal with those of the actual pressure to obtain an error signal, changing in response the opening time of the liquid valves,
    the computer giving signals according to the frequency of the pressure tools to actuate the gas valves, the actuation being delayed for a defined time with regard to the time of actuation of the liquid valves,
whereby as the outlets of the corresponding liquid and gas valves join together before the individual nozzles, the droplets that form at the opening of the nozzles are shot off to the zones of the pressure tools to be lubricated.

3. A process as claimed in claim 2, which comprises a delayline programmed in the computer causing a delay of the opening of the gas valves with regard to the opening of the fluid valves.

4. A process as claimed in claim 2, which comprises connecting the input of the cadence via a frequency counter with a computer and when the computer controls the speed of the pump this is done by regulating a motor operator (M1), this motor operator regulating a potentiometer (P2), governing the pump (P).

5. An apparatus for the controlled release of metered lubricating liquids or suspensions, comprising:
  a pulsation-free pump with drive component in conjunction with a pressureless storage container for holding the lubricant liquid or suspension, a pressure line which connects the outlet of the pump to one or more liquid valves, a differential pressure measuring system on the pressure line, one or more liquid valves and one or more pressurized gas valves which are located downstream of the liquid valves via a mixing chamber or a fork, an adjoining nozzle connection with one or more nozzles, a tachogenerator coupled to a drive shaft of the pump, a potentiometer and an electronic computer or comparator, the differential pressure measuring system for detecting the pressure differences converted into electrical values and the tachogenerator being in the form of a closed regulating circuit with feedback properties, which contains a controllable potentiometer, both being electrically connected to the computer or comparator, whilst in order to equalize pressure differences the computer or comparator is electrically connected to the liquid valves and in order to adapt the pump delivery to the cadence it is connected to the pump motor via a potentiometer.

* * * * *